Patented May 26, 1925.  1,539,084

UNITED STATES PATENT OFFICE.

EDWARD F. HIGGINS, OF BROOKLYN, NEW YORK, ASSIGNOR TO JOS. H. MEYER BROS., INC., OF BROOKLYN, NEW YORK, A CORPORATION OF NEW YORK.

MANUFACTURE OF IMITATION MOTHER-OF-PEARL.

No Drawing.      Application filed June 24, 1922. Serial No. 570,730.

*To all whom it may concern:*

Be it known that I, EDWARD F. HIGGINS, a citizen of the United States, residing at Brooklyn, in the county of Kings, State of New York, have made a certain new and useful Invention in Manufacture of Imitation Mother-of-Pearl, of which the following is a specification.

This invention relates to the manufacture of imitation mother-of-pearl.

The object of the invention is to produce a substance in imitation of mother-of-pearl, and which possesses the characteristic diffused sheen effects of genuine mother-of-pearl, and which is capable of being employed in the manufacture of various articles of commerce.

Other objects of the invention will appear more fully hereinafter.

The invention consists substantially in the mode of operation as hereinafter more fully set forth, and pointed out in the appended claims.

Various attempts have been made heretofore to produce a diffused sheen effect in pyroxylin and other plastic compounds, in imitation of mother-of-pearl, and various chemical pigments and other substances have been proposed for this purpose. But so far as I am aware such efforts have failed to attain a satisfactory degree of success in producing a diffused sheen effect approaching that of genuine mother-of-pearl.

In my pending application, Serial No. 529,246, filed January 14, 1922, I have set forth, described and claimed broadly a plastic composition and method of making the same, wherein the pigment of fish scales is employed, in the production of a body having a diffused sheen in imitation of genuine mother-of-pearl, for use in conjunction or in combination with a body constructed to produce an iridescent effect, the combination of these bodies resulting in combining the artificially produced sheen and the iridescent effects, thereby producing a composite body, structure or mass for use in the manufacture of various commercial articles. I have found, however, that by certain important and radical variations in the specific method described in my said application in connection with the production of the diffused sheen effect, and by introducing certain new and additional steps in the procedure, I am enabled to obtain a far more perfect approximation to the diffused sheen effect and appearance of genuine mother-of-pearl, and also to obtain a plastic composition which itself may be formed, fabricated or worked up into various articles of manufacture, and, if desired, without employing the body having the iridescence referred to.

In carrying out my present invention I propose, generally, to incorporate fish scale pigment into a suitable plastic composition in the absence of heat, and while the mass is maintained in a condition of plasticity that is undesirable in the ordinary process of operation as heretofore carried out. This step of the present invention I will refer to as the incorporating step. I then propose to effect a removal of solvent from the mass and to reduce the mass to a form and condition, adapting it to be employed in the subsequent operations. This step of the present invention I will refer to as the solvent removal step. After the removal of the solvent, as contemplated, I next proceed to form the material into a cake or block. This step I will refer to as the cake pressing step. After the mass has been cake pressed it is sliced into sheets. This step I will refer to as the sheeting step. The sheets thus produced may then be blanked out, moulded, die pressed, or otherwise fabricated, into various commercial products which will possess a remarkably close approximation to the rich, beautiful, diffused sheen of genuine mother-of-pearl.

I will now describe in detail a preferred mode of operation for carrying out my invention, as one practical application of the principles involved, and which, in practice, I have found to be satisfactory and efficient.

In carrying out my present invention I employ a suitable plastic composition, such, for example, as celluloid dough, though other pyroxylin compounds may be used. By celluloid dough I mean to include any pyroxylin or other plastic compound, when carried up to a certain stage in the ordinary process of producing the same. In the case of celluloid, for example, the nitrocellulose is made gelatinous with camphor and a solvent, such as alcohol, and the gelatinous mass is then filtered in the usual way. This mass is soft, clear, and transparent, and, in ordinary practice is placed in a mixer and further agitated under reduced pressure to remove the large excess of solvent. The mass is then worked on suitable heated rolls so as to reduce the same to homogeneous condition, and to enable the solvent remaining therein to further evaporate, and finally resulting in a more or less hardened and translucent mass. Before this hardened condition is reached, and while the material is still soft, transparent and clear, and before being subjected to the mixer under reduced pressure, it constitutes what I shall refer to as celluloid dough, and is in condition for use in carrying out my present invention. It is particularly important for my purposes that this dough mass be soft, and therefore, I prefer to utilize it for my purposes with an excess of solvent therein and before the evaporation of the solvent sufficient to cause the mass to harden to any great extent.

While in this soft dough state I propose to incorporate therein purified essence of dehydrated fish scale. This substance is preferably carried in suspension in a medium which is miscible with a solvent for the dough mass. I have found alcohol, acetone, and the like, suitable for the purpose. The incorporation of the fish scale product into the dough mass may be effected in various ways. I have found it satisfactory to work the fish scale product into the mass by working the dough back and forth between rolls while the fish scale suspension is poured onto the dough mass.

The utmost care is required in carrying out this incorporating step to avoid crushing the delicate fish scale material, thereby destroying its highly reflecting properties. Therefore it is important to employ a dough material which is soft and pliable to start with. It is equally important to maintain the mass in a softened condition during the incorporation of the fish scale pigment therein. By employing alcohol, acetone, or the like, which are also solvents for the dough, as a medium to carry in suspension the fish scale pigment, I am enabled to maintain a sufficient excess of solvent in the mass while it is being worked to keep the same softened, thereby avoiding the danger of physically breaking down or crushing the delicate structure of the fish scale pigment. I have found that it is important, also, in carrying out my invention to avoid the application of heat during the incorporation of the fish scale solvent solution into the dough mass. The presence or influence of heat applied at this stage of the operation tends to drive off the solvent contained in the dough, thereby causing the dough mass to harden, whereas, in accordance with my invention, the dough must be kept in a softened condition by retaining as much of the solvent therein as possible while effecting the incorporation of the fish scale pigment.

The hardening of the dough mass is to be particularly avoided, as above pointed out. In this respect my present invention departs radically from former practice. As further contributing to the attainment of the best results, the incorporation of the fish scale pigment into the dough mass should be accomplished as quickly as possible as the solvent contained in the dough mass tends to evaporate, thereby hardening the mass, during the working or manipulation of the same to effect the incorporation therein of the fish scale pigment.

The resulting product of this step of the process is a whitish, translucent, soft, pliable, dough-like mass. This mass is unworkable in the ordinary subsequent steps usually employed in the manufacture of celluloid, or the like compositions, owing to the presence therein of an excess of the solvent employed. This excess is due to the fact that in carrying out my invention the initial celluloid dough is so used at a stage where and in such a manner that it retains more solvent than in the ordinary process, and, in addition, more solvent is supplied when the fish-scale pigment is added. In other words, less solvent is permitted to be lost by evaporation or otherwise. In carrying out this step the presence of heat is neither necessary nor desirable, as in the case of the ordinary method of celluloid manufacture, as the presence of heat tends to accelerate the evaporation of the solvent, thereby hardening the mass, a result I desire to avoid at this stage of the operation. The absence of heat marks an important departure from ordinary practice. Again, the incorporation of the fish scale pigment into the mass should be accomplished quickly, and therefore the manipulation of the mass to effect such incorporation is continued only for a short period of time so as to avoid as much as possible the evaporation of the solvent or the crushing or grinding of the pigment, whereas, in the ordinary celluloid process pains are taken to eliminate as much of the solvent as possible at this stage, and consequently the manipulation of the mass is continued and even repeated after it has been subjected to the action of the vacuum mixer.

The resulting mass, according to ordinary practice, is subjected to the cake pressing operation. Since, however, in the case of my invention, the mass still contains an excess of solvent, it is not in a condition which permits it to be carried through the cake pressing step, but it must be treated to remove the excess of solvent. Therefore, as an intermediate step between the incorporating and cake pressing steps I propose to effect a desirable elimination of the solvent. This might be accomplished in various ways. I have found that the desired result can be quickly, effectively and satisfactorily accomplished by subjecting the soft, translucent mass resulting from the incorporating step to compression and extrusion according to standard extrusion practice. This is accomplished by placing the mass in an extruding machine, and subjecting the same to pressure, say, from 1000 to 3000 pounds pressure per square inch, and without the application of heat. The purpose of this is to weld the material into a compact mass and force out any air contained therein. In order to effect an intimate union or welding of all the parts of the mass, I prefer to heat the mass while held under pressure.

The compacted and welded mass is then formed into a thin sheet of any desired thickness according to the requirements. I have found a sheet of a thickness of about fifty one-thousandths of an inch suitable for my purpose, but, of course, my invention is not to be limited or restricted in this respect.

The resulting thin sheets are then exposed a short time, say three to six hours, to the drying effect of air in order to permit surface evaporation of the solvent contained therein. This causes the sheets to become harder and harder as the surface evaporation continues. After the sheets become fairly hard, approaching the condition of a celluloid mass that is ready for cake pressing, the surfaces of the sheets are moistened with a slow drying solvent. I have found that amyl acetate, butyl acetate, and the like, serve this purpose, and at the same time it also serves the purpose of enhancing the brilliancy of the surfaces of the sheets. The slow drying solvent may be applied to the surfaces of the sheets in any desired manner, such as by applying a soft sponge or rag, which has been saturated in the solvent, over the surfaces, one or both, of the sheets, or by dipping the sheets in the solvent, or otherwise. While this step of the process is desirable, it is not essential, and, in some cases, may be dispensed with.

The thin sheets produced as above described, are next stacked or piled, the one upon the other, preparatory to subjecting the same to the cake pressing operation. In order to impart a desirable irregular, variegated, or mottled appearance in the final product, the disposition and relation of the sheets may be varied while being piled up into stacks. Thus, the successive sheets, or some of them, may be disposed in cross-wise relation to the others; or some of the sheets may be cut up into smaller bits or pieces, and these laid on the pile or stack irregularly or indiscriminately, according to the purpose for which the final product is to be used, thereby securing a very desirable variegated color or sheen effects in the final product.

The stack or pile of sheets, built up as described, is then subjected to the ordinary cake pressing operation in a suitable press under heat. The softening of the surfaces of the sheets by the application thereto of a slow drying solvent enables the individual sheets to more perfectly amalgamate into or with each other in the cake pressing operation.

The cake pressing operation results in the production of a solid mass or block which is free from occluded vapors or gases.

This block is then sheeted; that is, it is sliced into sheets of any desired thickness, according to the purposes for which the material is to be used. Any knife line or lines left or produced in the sheets by the action of the slicing knife, or any buckling of the surfaces of the sheets may be removed in any suitable or convenient manner, as by polishing the surfaces of the sheets, or by pressing them between hot plates, or otherwise.

These sheets, when thoroughly seasoned, that is, when the residual solvent still contained therein has been reduced as much as possible by evaporation to prevent subsequent warping or contraction, constitute the stock from which various articles of commerce may be made. This stock may be worked up into articles of manufacture by blanking out, moulding, die pressing, stamping, or otherwise, or subjecting the same to any of the well known processes or operations to which ordinary celluloid is put in the manufacture of various articles, and the articles produced therefrom possess the beautiful brilliant white translucence and variegated sheen effects closely approximating that of genuine mother-of-pearl, and such articles are particularly characterized by the absence of a dulled granular metallic appearance which predominates in the products heretofore obtained in the effort to secure an imitation mother-of-pearl composition. The stock is also workable into any desired form, in mass or otherwise, without cracking, fracturing, or breaking.

Having now set forth the objects and nature of my invetnion, and the method of carrying the same into practice, what I claim as new and useful and of my own invention, and desire to secure by Letters Patent is,—

1. In the manufacture of imitation mother-of-pearl, the process which consists in incorporating the pigment of fish scales into and distributing the same throughout a mass of plastic material while the latter is maintained in a more or less fluid condition by an excess of solvent therefor.

2. In the manufacture of imitation mother-of-pearl, the process which consists in incorporating the pigment of fish scales into and distributing the same throughout a mass of plastic material while the latter is maintained in a more or less fluid condition by an excess of solvent therefor and without the application of heat.

3. In the manufacture of imitation mother-of-pearl, the process which consists in incorporating into and distributing throughout a plastic mass while containing an excess of solvent, a liquid carrying in suspension therein the pigment of fish scales.

4. In the manufacture of imitation mother-of-pearl, the process which consists in incorporating into and distributing throughout a plastic mass a solvent for the mass carrying in suspension therein the pigment of fish scales.

5. In the manufacture of imitation mother-of-pearl, the process which consists in incorporating into a plastic mass while maintained in a softened state the pigment of fish scales, by adding to such softened mass a solvent for the mass containing the pigment.

6. In the manufacture of imitation mother-of-pearl, the process which consists in maintaining in a plastic mass an excess of solvent therefor and working into such mass a liquid solvent for the mass and carrying fish scale pigment in suspension therein.

7. In the manufacture of imitation mother-of-pearl, the process which consists in incorporating the pigment of fish scales into and distributing the same throughout a mass of plastic material while the latter is maintained in a more or less fluid condition by an excess of solvent, and then removing the excess of solvent from the mass.

8. In the manufacture of imitation mother-of-pearl, the process which consists in incorporating into and distributing throughout a mass of plastic material the pigment of fish scales, while said mass is maintained in a more or less fluid condition by an excess of solvent therefor, then removing the solvent contained in the mass, and then subjecting the mass to heat and pressure to form the same into a cake or block.

9. In the manufacture of imitation mother-of-pearl, the process which consists in incorporating into a mass of plastic material the pigment of fish scales, while said mass is maintained in a more or less fluid condition by an excess of solvent therefor then removing the solvent contained in the mass, and then subjecting the mass to heat and pressure to form the same into a cake or block, and then separating the cake or block into sheets.

10. In the manufacture of imitation mother-of-pearl, the process which consists in incorporating into and distributing throughout a plastic mass while maintained in a softened state by an excess of solvent the pigment of fish scales, by adding to such softened mass a solvent for the mass containing the pigment, then removing the solvent contained in the mass, then subjecting the mass to heat and pressure to form the same into a cake or block, and then separating the cake or block into sheets.

11. In the manufacture of imitation mother-of-pearl, the process which consists in incorporating into and distributing throughout a mass of plastic material while containing an excess of solvent the pigment of fish scales, and then subjecting the mass to pressure.

12. In the manufacture of imitation mother-of-pearl, the process which consists in incorporating the pigment of fish scales into and distributing the same throughout a mass of plastic material while maintained in a fluid state by an excess of solvent, then removing the excess of solvent from the mass, and forming the mass into thin sheets, and then forming the sheets under pressure into a cake or block.

13. In the manufacture of imitation mother-of-pearl, the process which consists in incorporating the pigment of fish scales into and distributing the same throughout a mass of plastic material while said mass is maintained in a fluid state by an excess of solvent, then removing the excess of solvent and forming the mass into thin sheets, then stacking the sheets and compressing the stack into a cake or block.

14. In the manufacture of imitation mother-of-pearl, the process which consists in incorporating the pigment of fish scales into and distributing the same throughout a mass of plastic material containing an excess of solvent, then removing the excess of solvent and forming the mass into thin sheets, then stacking the sheets and compressing the stack into a cake or block, and then slicing the cake or block into sheets.

15. In the manufacture of imitation mother-of-pearl, the process which consists in incorporating into and distributing throughout a mass of plastic material while maintained in a fluid state by an excess of solvent the pigment of fish scales, then subjecting the mass to pressure and forming the same into sheets, then stacking the sheets in indiscriminate relation to each other and pressing the stack into a cake or block, and then slicing the cake or block into sheets.

16. In the manufacture of imitation mother-of-pearl, the process which consists in incorporating into a mass of plastic material the pigment of fish scales, then subjecting the mass to pressure and forming the same into thin sheets, then applying to the surface of the thin sheets a slowly drying solvent therefor and stacking them and compressing the stack into a cake or block, and slicing the block into sheets.

17. In the manufacture of imitation mother-of-pearl, the process which consists in incorporating into a mass of plastic material the pigment of fish scales, then subjecting the mass to pressure to produce a homogeneous block, then cutting said block into thin sheets, then applying amyl acetate to the surface of the sheets and stacking them, then compressing the stack under heat and pressure, and slicing the compressed mass into sheets.

18. In the manufacture of imitation mother-of-pearl, the process which consists in incorporating the pigment of fish scales into a mass of plastic material while in a fluid state from an excess of solvent, then removing the excess solvent and forming the mass into thin sheets, then applying a slow drying solvent to the surface of the sheets and stacking them, then subjecting the stack to heat and pressure to form the same into a cake or block, and then slicing the block into sheets.

19. In the manufacture of imitation mother-of-pearl, the process which consists in incorporating into a mass of plastic material the pigment of fish scales, then subjecting the mass to pressure and forming the same into thin sheets, then stacking the sheets upon each other, one or more of the sheets being formed into sections of various areas and the sections indiscriminately placed in the stack, then compressing the stack into a cake or block.

20. In the manufacture of imitation mother-of-pearl, the process which consists in incorporating into a mass of plastic material the pigment of fish scales, then subjecting the mass to pressure and forming the same into thin sheets, then stacking the sheets upon each other, one or more of the sheets being formed into sections of various areas and the sections indiscriminately placed in the stack, then compressing the stack into a cake or block, and then slicing the cake or block into sheets.

21. In the manufacture of imitation mother-of-pearl, the process which consists in incorporating into a mass of plastic material the pigment of fish scales, then welding the mass by heat and pressure into a compact body and forming the same into thin sheets, then assembling the sheets into a stack and amalgamating the sheets of the stack into a cake or block.

22. In the manufacture of imitation mother-of-pearl, the process which consists in incorporating into a mass of plastic material the pigment of fish scales, then welding the mass by heat and pressure into a compact body and forming the same into thin sheets, then assembling the sheets into a stack and amalgamating the sheets of the stack into a homogeneous cake or block, and finally slicing the cake or block into sheets.

23. In the manufacture of imitation mother-of-pearl, the process which consists in maintaining celluloid dough in a plastic condition with an excess of solvent therefor, and while in that condition incorporating therein the pigment of fish scales.

24. In the manufacture of imitation mother-of-pearl, the process which consists in maintaining celluloid dough in a plastic condition with an excess of solvent therefor, and while in that condition incorporating therein the pigment of fish scales, then removing the excess of solvent and forming the mass into thin sheets, then stacking the sheets upon each other and compressing the stack into a homogeneous cake or block.

25. In the manufacture of imitation mother-of-pearl, the process which consists in maintaining celluloid dough in a plastic condition with an excess of solvent therefor, and while in that condition incorporating therein the pigment of fish scales, then removing the excess of solvent and forming the mass into thin sheets, then stacking the sheets upon each other and compressing the stack into a homogeneous cake or block, and slicing the cake or block into sheets.

In testimony whereof I have hereunto set my hand on this 20th day of June, A. D., 1922.

EDWARD F. HIGGINS.